US012786671B2

(12) United States Patent
Belling et al.

(10) Patent No.: US 12,786,671 B2
(45) Date of Patent: Nov. 3, 2026

(54) APPARATUS, METHOD, AND COMPUTER PROGRAM FOR A MOBILE TELECOMMUNICATION NETWORK COMPRISING MULTIPLE PUBLIC LAND MOBILE NETWORK SHARING A RADIO ACCESS NETWORK NODE

(71) Applicant: Nokia Technologies Oy, Espoo (FI)

(72) Inventors: Horst Thomas Belling, Munich (DE); Bighnaraj Panigrahi, Bangalore (IN); Ugur Baran Elmali, Munich (DE); Philippe Godin, Massy (FR)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 18/413,634

(22) Filed: Jan. 16, 2024

(65) Prior Publication Data

US 2024/0244400 A1 Jul. 18, 2024

(30) Foreign Application Priority Data

Jan. 16, 2023 (IN) ............................. 202341003169

(51) Int. Cl.
*H04W 4/06* (2009.01)
*H04W 8/26* (2009.01)
*H04W 84/04* (2009.01)

(52) U.S. Cl.
CPC ............... *H04W 4/06* (2013.01); *H04W 8/26* (2013.01); *H04W 84/042* (2013.01)

(58) Field of Classification Search
CPC ......... H04W 4/06; H04W 8/26; H04W 76/10; H04W 76/11; H04W 76/40; H04W 84/042
See application file for complete search history.

(56) References Cited

U.S. PATENT DOCUMENTS

2023/0086661 A1* 3/2023 Rönneke ............... H04L 65/611
2024/0040661 A1* 2/2024 Baek ..................... H04W 76/40
(Continued)

OTHER PUBLICATIONS

Ericsson, "KI#2, Update on Conclusion on 5MBS MOCN Network Sharing", Nov. 14-18, 2022, 3GPP SA WG2 Meeting #154, S2-2210253, pp. 1-4 (Year: 2022).*
(Continued)

*Primary Examiner* — Paul H. Masur
(74) *Attorney, Agent, or Firm* — Lippes Mathias LLP

(57) ABSTRACT

Apparatuses, method, and computer-program for a mobile telecommunication network comprising multiple public land mobile networks sharing a radio access network node are provided. An apparatus of one of the multiple public land mobile networks may include at least one processor; and at least one memory comprising: instructions which, when executed by the at least one processor cause the apparatus at least to: receive, from an application function of a content provider, a request for allocation of a temporary mobile group identity for a shared multicast/broadcast session comprising an index value to be used to select a temporary mobile group identity for the shared multicast/broadcast service from the list of temporary mobile group identities for shared services; select, based on the index value, a temporary mobile group identity for the shared multicast/broadcast service from a list or range of temporary mobile group identities for shared services; and send, to the application function, the selected temporary mobile group identity for the shared multicast/broadcast service.

17 Claims, 11 Drawing Sheets

100

(56) References Cited

U.S. PATENT DOCUMENTS

| | | | | |
|---|---|---|---|---|
| 2024/0114592 | A1* | 4/2024 | Zhang | H04W 76/40 |
| 2025/0212295 | A1* | 6/2025 | Baek | H04W 64/00 |
| 2025/0275013 | A1* | 8/2025 | Xu | H04W 4/06 |

OTHER PUBLICATIONS

Shrivastava et al., "5G Evolution for Multicast and Broadcast Services in 3GPP Release 17", Oct. 21, 2022, IEEE Communications Standards Magazine (vol. 6, Issue: 3, Sep. 2022), pp. 70-76, DOI: 10.1109/MCOMSTD.0001.2100068 (Year: 2022).*

"3rd Generation Partnership Project; Technical Specification Group Services and System Aspects; Study on architectural enhancements for 5G multicast-broadcast services; Phase 2 (Release 18)", 3GPP TR 23.700-47, V18.0.0, Dec. 2022, pp. 1-135.

"3rd Generation Partnership Project; Technical Specification Group Services and System Aspects; Architectural enhancements for 5G multicast-broadcast services; Stage 2 (Release 18)", 3GPP TS 23.247, V18.0.0, Dec. 2022, pp. 1-122.

"3rd Generation Partnership Project; Technical Specification Group Services and System Aspects; System architecture for the 5G System (5GS); Stage 2 (Release 18)", 3GPP TS 23.501, V18.0.0, Dec. 2022, pp. 1-593.

"On resource efficiency for MBS reception in RAN sharing scenario", 3GPP TSG-SA WG2 Meeting #154AH-E, S2-2300590, Huawei, Jan. 16-20, 2023, 11 pages.

Extended European Search Report received for corresponding European Patent Application No. 24152150.9, dated Mar. 19, 2024, 8 pages.

"Support of MBS in RAN sharing scenarios", 3GPP TSG-RAN3 Meeting #117bis-e, R3-225340, Agenda: 15.2, Qualcomm Incorporated, Oct. 10-18, 2022, 4 pages.

"Updates to Evaluation and Conclusion for key issue 2", SA WG2 Meeting #S2-154, S2-2210230, Agenda: 9.18.1, Nokia, Nov. 14-18, 2022, 10 pages.

* cited by examiner

500

APPARATUS, METHOD, AND COMPUTER PROGRAM FOR A MOBILE TELECOMMUNICATION NETWORK COMPRISING MULTIPLE PUBLIC LAND MOBILE NETWORK SHARING A RADIO ACCESS NETWORK NODE

CROSS-REFERENCE TO RELATED APPLICATIONS

This application claims the benefit of priority of Indian Provisional Patent Application No. 202341003169 filed Jan. 16, 2023, which is hereby incorporated by reference as if reproduced in its entirety.

TECHNICAL FIELD

Example embodiments of the present disclosure generally relate to mobile telecommunication networks operating in accordance with fifth-generation radio access technology.

BACKGROUND

A mobile telecommunication network enables communication between communication devices and one or more data networks and provides services to those communication devices. Non-limiting examples of services provided by mobile telecommunication network may comprise enhanced mobile broadband services, such as multicast/broadcast services, ultra-reliable low latency communications, mission-critical communications, massive internet of things (IOT), and multimedia services.

A mobile telecommunication network and its associated communication devices typically operate in accordance with a given standard or specification that sets out what the various entities of the communication system are permitted to do and how that should be achieved. Communication protocols and/or parameters that are to be used for communications between the various entities are also typically defined. Examples of such standards are the so-called 5G standards provided by the 3rd Generation Partnership Project (3GPP). 3GPP is a standards organization that has issued several releases (Rel) of a standard related to radio access technologies. The standard includes various technical specifications (TSs) that define network configurations and protocols related to a communications network. Currently, Release 17 (Rel. 17) of the 3GPP standard has been released.

A mobile telecommunication network may comprise various entities, including one or more access networks and a core network. Non-limiting examples of access networks include a radio access network, a non-terrestrial network (e.g., a satellite network), a wireless local network, and a fixed network. A mobile telecommunication network can typically be divided into cells and is therefore often referred to as a cellular network.

SUMMARY

The present disclosure describes apparatuses of a mobile telecommunication network, and methods performed by the apparatuses of the mobile telecommunication provide to provide shared multicast/broadcast services via multiple public land mobile networks of the mobile telecommunication network that share one or more radio access nodes of a radio access network.

In accordance with a first aspect of the present disclosure, there is provided an apparatus comprising at least one processor, and at least one memory comprising one or more index values, each index value of the one or more index values corresponding to a shared multicast/broadcast service to be provided via multiple public land mobile networks that are sharing radio access network nodes of a radio access network and instructions which, when executed by the at least one processor cause the apparatus at least to: determine that a shared share multicast/broadcast service to be provided via the multiple public land mobile networks is to be established; select an index value from the one or more index values corresponding to the identified shared share multicast/broadcast service; send, to a multicast/broadcast session management function of a first public land mobile network of the multiple public land mobile networks, a request for allocation of a temporary mobile group identity, the request comprising an index value to be used to select a temporary mobile group identity for the shared multicast/broadcast service; and receive, from the multicast/broadcast session management function of the public land mobile network, a response to the request for allocation of a temporary mobile group identity, the response comprising a first temporary mobile group identity for the shared multicast/broadcast service selected by the session management function of public land mobile network.

In some or all examples of the first aspect, the at least one memory comprises further instructions which, when executed by the at least one processor cause the apparatus to: send a second request for allocation of a temporary mobile group identity to a multicast/broadcast session management function of a core network of a second public land mobile network of the multiple public land mobile networks, the second request comprising the index value to be used for allocation of a temporary mobile group identity for the shared multicast/broadcast service; and receive, from the multicast/broadcast session management function of the core network of the second public land mobile network of the multiple public land mobile networks, a response to the second temporary mobile group identity allocation request, the response to the second temporary mobile group identity allocation request comprising a second a temporary mobile group identity for the shared multicast/broadcast service selected by the session management function of the core network of the second public land mobile network based on the index value.

In some or all examples of the first aspect, the request for allocation of a temporary mobile group identity is a temporary mobile group identity request.

In some or all examples of the first aspect, the second request for allocation of a temporary mobile group identity is a temporary mobile group identity request.

In some or all examples of the first aspect, the at least one memory comprises further instructions which, when executed by the at least one processor cause the apparatus to at least one of: trigger creation of a multicast/broadcast service session for the shared multicast/broadcast service in the first public land mobile network using the first temporary mobile group identity for the shared multicast/broadcast service; or trigger creation of a multicast/broadcast service session for the shared multicast/broadcast service in the second public land mobile network using the second temporary mobile group identity for the shared multicast/broadcast service.

In some or all examples of the first aspect, the request for allocation of a temporary mobile group identity is an MBS session creation request comprising an indication indicating that a temporary mobile group identity is to be allocated for the shared multicast/broadcast service. The indication may be a flag or a bit value indicating that a temporary mobile group identity is to be allocated for the shared multicast/broadcast service.

In some or all examples of the first aspect, the second request for allocation of a temporary mobile group identity is a second MBS session creation request comprising an indication that a temporary mobile group identity is to be allocated for the shared multicast/broadcast service.

In some or all examples of the first aspect, the request for allocation of a temporary mobile group identity is sent to the multicast/broadcast session management function of the core network of the public land mobile network via a network exposure function of the core network of the public land mobile network.

In some or all examples of the first aspect, the second request for allocation of a temporary mobile group identity is sent to the multicast/broadcast session management function of the core network of the second public land mobile network via a network exposure function of the core network of the second public land mobile network.

In some or all examples of the first aspect, the instructions which, when executed by the at least one processor further cause the apparatus to: send service announcements related to the shared multicast/broadcast service to one or more user equipment in the public land mobile network using the first temporary mobile group identity.

In some or all examples of the first aspect, the instructions which, when executed by the at least one processor further cause the apparatus to: send service announcements related to the shared multicast/broadcast service to one or more user equipment in the second public land mobile network using the second temporary mobile group identity.

In some or all examples of the first aspect, the at least one memory comprises a plurality of index values, wherein the instructions which, when executed by the at least one processor cause the apparatus at least to: determine that at least one other shared multicast/broadcast service to be provided via the multiple public land mobile networks is to be established; select at least one other index value from the plurality of index values corresponding to the at least one other shared share multicast/broadcast service; include the at least one other index value in the request for allocation of a temporary group mobile identifier; and wherein the response comprises a temporary mobile group identity for each of the at least one other shared multicast/broadcast service selected by the multicast/broadcast session management function of the first public land mobile network.

In accordance with a second aspect of the present disclosure, there is provided an apparatus comprising: at least one processor, and at least one memory comprising: information identifying a first public land mobile network comprising a lead multicast/broadcast session management function of multiple public land mobile networks that are sharing one or more radio access network nodes and provide at least one shared multicast/broadcast service; instructions which, when executed by the at least one processor cause the apparatus at least to: determine that a shared multicast/broadcast service to be provided via the multiple public land mobile networks is to be established; send a first request for the allocation of a temporary mobile group identity to the lead multicast/broadcast session management function of a first public land mobile network of the multiple public land mobile networks, the first request comprising an indication that request relates to a shared multicast/broadcast service; receive, from the lead multicast/broadcast session management function, a response to the first request for the allocation of a temporary mobile group identity, the response comprising a first temporary mobile group identity selected by the lead multicast/broadcast session management function for the shared multicast/broadcast session; send a second request for the allocation of a second temporary mobile group identity to a second multicast/broadcast session management function of a second public land mobile network of the multiple public land mobile networks, the second request comprising the first temporary mobile group identity; and receive, from second multicast/broadcast session management function, a response to the second request, the response comprising the second temporary mobile group identity for the shared multicast/broadcast service selected by the second multicast/broadcast session management function based on the first temporary mobile group identity.

In some or all examples of the second aspect, at least one of the first request for allocation of a temporary mobile group identity or the second request is for allocation of a temporary mobile group identity a temporary mobile group identity request.

In some or all examples of the second aspect, the instructions which, when executed by the at least one processor further cause the apparatus to at least one of: trigger creation of a multicast/broadcast service session for the shared multicast/broadcast service in the first public land mobile network using the first temporary mobile group identity for the shared multicast/broadcast service; or trigger creation of a multicast/broadcast service session for the shared multicast/broadcast service in the second public land mobile network using the second temporary mobile group identity for the shared multicast/broadcast service.

In some or all examples of the second aspect, at least one of the first request for allocation of a temporary mobile group identity or the second request for allocation of a temporary mobile group identity is an MBS session creation request comprising an indication that a temporary mobile group identity is to be allocated for the shared multicast/broadcast service.

In some or all examples of the second aspect, the first request for allocation of a temporary mobile group identity is sent to the multicast/broadcast session management function of the core network of the first public land mobile network via a network exposure function of the core network of the first public land mobile network and the second request for allocation of a temporary mobile group identity is sent to the multicast/broadcast session management function of the core network of the second public land mobile network via a network exposure function of the core network of the second public land mobile network.

In some or all examples of the second aspect, the instructions which, when executed by the at least one processor further cause the apparatus to at least one of: send service announcements related to the shared multicast/broadcast service to one or more user equipment in the first public land mobile network using the first temporary mobile group identity; or send service announcements related to the shared multicast/broadcast service to one or more user equipment in the second public land mobile network using the second temporary mobile group identity.

In some or all examples of the second aspect, the instructions which, when executed by the at least one processor further cause the apparatus at least to: determine that at least one other shared multicast/broadcast service to be provided via the multiple public land mobile networks is to be established; request the allocation of at least one third temporary group mobile identifiers in the first request for the allocation of the first temporary group mobile identifier, the response comprising the at least one third temporary mobile group identity for each of the at least one other shared multicast/broadcast service selected by the multicast/broadcast session management function of the first public land mobile network; request the allocation of at least one fourth temporary group identity in the second request, the second request comprising the at least one third temporary mobile group identity; receive, from second multicast/broadcast session management function, a response to the second request, the response comprising the at least one fourth temporary group identity for the at least one other shared multicast/broadcast service selected by the second multicast/broadcast session management function based on the at least one third temporary mobile group identity.

In accordance with a third aspect of the present disclosure, there is provided an apparatus comprising apparatus of a public land mobile network, the apparatus comprising: at least one processor; and at least one memory. The at least one memory comprises instructions which, when executed by the at least one processor cause the apparatus at least to: receive, from an application function of a content provider, a request for allocation of a temporary mobile group identity for a shared multicast/broadcast session comprising an index value to be used to select a temporary mobile group identity for the shared multicast/broadcast service from the list of temporary mobile group identities for shared services; select, based on the index value, a temporary mobile group identity for the shared multicast/broadcast service from a list or range of temporary mobile group identities for shared services; and send, to the application function, the selected temporary mobile group identity for the shared multicast/broadcast service.

In some or all examples of the third aspect, the instructions which, when executed by the at least one processor further cause the apparatus to retrieve the list or range of temporary mobile group identities for shared services from the at least one memory or from a database storing the list of temporary mobile group identities for shared services.

In some or all examples of the third aspect, the request for allocation of a temporary mobile group identity is received from the application function via a network exposure function of the public land mobile network.

In some or al all examples of the third aspect, the request for allocation of a temporary mobile group identity is a temporary mobile group identity request.

In some or all examples of the third aspect, the request for allocation of a temporary mobile group identity the is an MBS session creation request comprising an indication that a temporary mobile group identity is to be allocated for the shared multicast/broadcast service.

In some or all examples of the third aspect, the instructions which, when executed by the at least one processor further cause the apparatus to: request that one or more radio access nodes of a radio access network shared by the public land mobile network and the another public land mobile network create a multicast/broadcast service session for the shared multicast/broadcast service.

In some or all examples of the third aspect, the instructions which, when executed by the at least one processor further cause the apparatus to: store an indication that the temporary mobile group identity for the shared multicast/broadcast service has been allocated.

In accordance with a fourth aspect of the present disclosure, there is provided an apparatus of a core network of a public land mobile network. The apparatus comprises at least one processor; and at least one memory comprising: a first list or range of temporary mobile group identities, wherein the temporary mobile group identities are to be used for shared multicast/broadcast services to be provided via multiple public land mobile networks that are sharing one or more radio access network nodes. The at least one memory also comprises instructions which, when executed by the at least one processor cause the apparatus to: receive a request for the allocation of a temporary mobile group identity, the request comprising an indication that request relates to a shared multicast/broadcast service; select at least one second temporary mobile group identity a first list or range of temporary mobile group identities; and send a response to the request for the allocation temporary mobile group identity, the response comprising the selected temporary mobile group identity.

In some or all examples of the fourth aspect, the request for allocation of a temporary mobile group identity is received from the application function via a network exposure function of the public land mobile network.

In some or all examples of the fourth aspect, the request for allocation of a temporary mobile group identity is a temporary mobile group identity request.

In some or all examples of the fourth aspect, the request for allocation of a temporary mobile group identity the is an MBS session creation request comprising an indication that a temporary mobile group identity is to be allocated for the shared multicast/broadcast service.

In some or all examples of the fourth aspect, the instructions which, when executed by the at least one processor further cause the apparatus to: request that one or more radio access nodes of a radio access network shared by the public land mobile network and the another public land mobile network create a multicast/broadcast service session for the shared multicast/broadcast service.

In some or all examples of the fourth aspect, the instructions which, when executed by the at least one processor further cause the apparatus to: store an indication that the selected temporary mobile group identity for the shared multicast/broadcast service has been allocated.

In accordance with a fifth aspect of the present disclosure, there is provided an apparatus of a core network of a public land mobile network. The apparatus comprises at least one processor; and at least one memory comprising: a first list or range of temporary mobile group identities, wherein the temporary mobile group identities are to be used for shared multicast/broadcast services to be provided via multiple public land mobile networks that are sharing one or more radio access network nodes. The at least one memory further comprises instructions which, when executed by the at least one processor cause the apparatus to: receive a request for the allocation of a temporary mobile group identity, the request comprising an indication that request relates to a shared multicast/broadcast service; select a temporary mobile group identity from the first list or range of temporary mobile group identities; and send a response to the request for the allocation temporary mobile group identity, the response comprising the selected temporary mobile group identity.

In some or all examples of the fifth aspect, the request for allocation of a temporary mobile group identity is received from the application function via a network exposure function of the public land mobile network.

In some or all examples of the fifth aspect, the request for allocation of a temporary mobile group identity is a temporary mobile group identity request.

In some or all examples of the fifth aspect, the request for allocation of a temporary mobile group identity the is an MBS session creation request comprising an indication that a temporary mobile group identity is to be allocated for the shared multicast/broadcast service.

In some or all examples of the fifth aspect, the instructions which, when executed by the at least one processor further cause the apparatus to: request that one or more radio access nodes of a radio access network shared by the public land mobile network and the another public land mobile network create a multicast/broadcast service session for the shared multicast/broadcast service.

In some or all examples of the fifth aspect, the instructions which, when executed by the at least one processor further cause the apparatus to: store an indication that the selected temporary mobile group identity for the shared multicast/broadcast service has been selected.

In accordance with a sixth aspect of the present disclosure, there is provided an apparatus of a radio access network node shared by multiple public land mobile networks. The apparatus comprises: at least one processor; and at least one memory comprising for each public land mobile network of multiple public land mobile networks sharing the radio access network, a list or range of temporary mobile group identities corresponding to shared multicast/broadcast services. The at least one memory further comprises instructions which, when executed by the at least one processor cause the apparatus at least to: receive a request for creation or start of multicast/broadcast service sessions for a shared multicast/broadcast service from each public land mobile network of the multiple public land mobile networks, each respective request comprising a temporary group mobile identifier selected by a multicast/broadcast session management function of the public land mobile network; determine that the request for creation or start of the multicast/broadcast service sessions are for a shared multicast/broadcast service based on temporary mobile group identifiers received in the requests having a same position in the list or range of temporary mobile group identities for the each corresponding public land mobile networks; and broadcast data for the shared multicast/broadcast service to user equipments in each of the multiple public land mobile networks.

In accordance with a seventh aspect of the present disclosure, there is provided apparatus of a core network of a public land mobile network. The apparatus comprises at least one processor; and at least one memory comprising instructions which, when executed by the at least one processor cause the apparatus at least to: receive a request for the allocation of at least one temporary mobile group identity, the request comprising at least one of an index value, an indication that the request relates to a shared multicast/broadcast service, or at least one temporary mobile group identity; based on the at least one index value, the indication that the request relates to a shared multicast/broadcast service, or the at least one temporary mobile group identity, select a multicast/broadcast session management function capable of handling shared multicast/broadcast services to be broadcasted via multiple public land mobile networks that are sharing radio access network nodes; and send the request for the allocation of at least one temporary mobile group identity to the selected multicast/broadcast session management function.

In some or all examples of the seventh aspect, the at least one memory further comprises instructions which, when executed by the at least one processor further cause the apparatus to: request information about available multicast/broadcast session management function from a network resource function, where the information comprises for each multicast/broadcast session management function an indication whether the multicast/broadcast session management function is capable of handling shared multicast/broadcast services; and select the multicast/broadcast session management function using the requested information.

Other aspects and features of the present disclosure will become apparent to those of ordinary skill in the art upon review of the following description of specific implementations of the application in conjunction with the accompanying figures.

BRIEF DESCRIPTION OF THE FIGURES

Reference will now be made, by way of example only, to the accompanying drawings in which.

Similar reference numerals may have been used in different figures to denote similar components. Unless otherwise specifically noted, articles depicted in the drawings are not necessarily drawn to scale.

DETAILED DESCRIPTION OF EXAMPLE EMBODIMENTS

Figure 1:
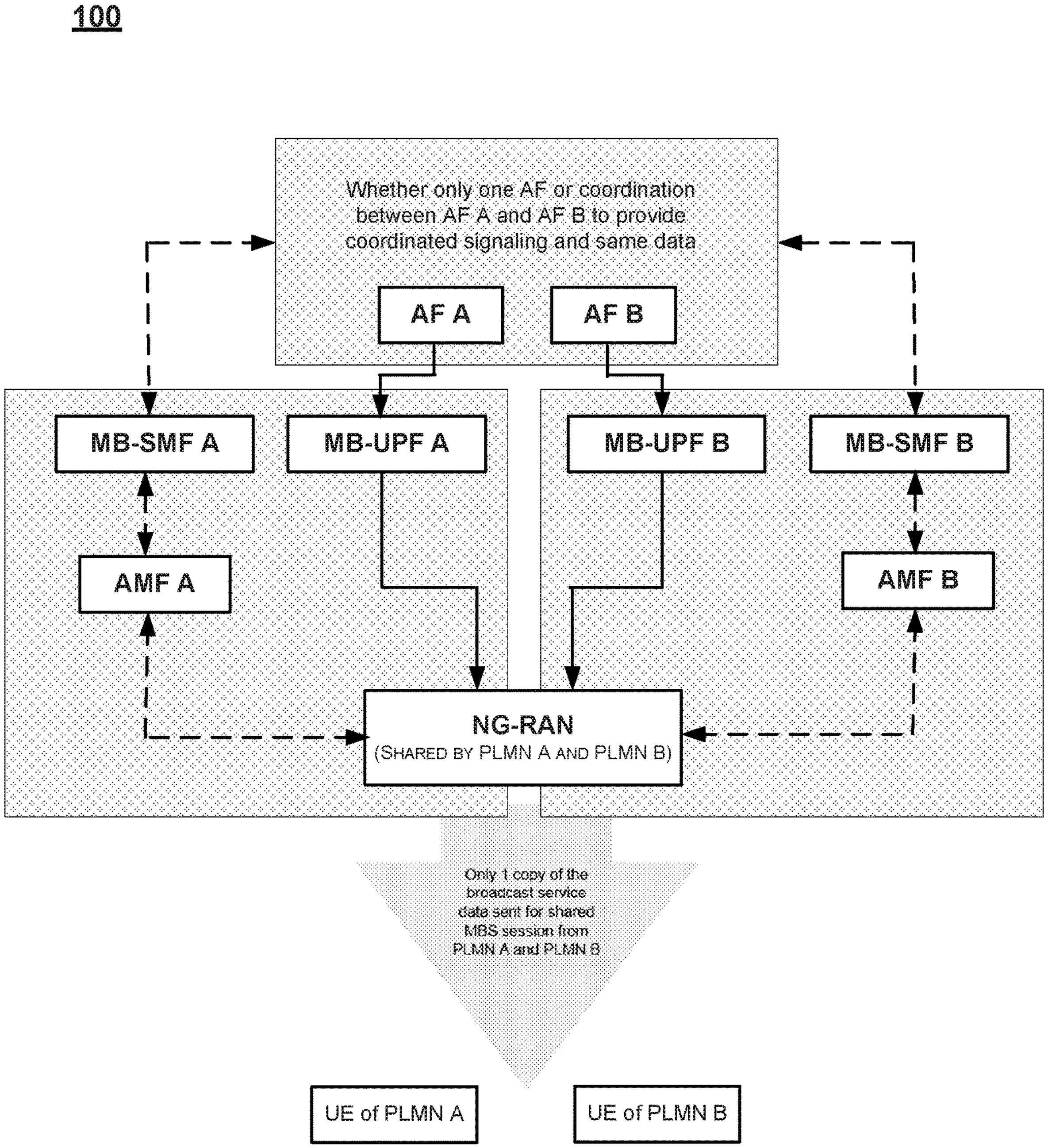
FIG. 1 is a block diagram of a mobile telecommunication network comprising multiple public land mobile networks sharing a radio access network node of a next generation radio access network and providing a shared multicast/broadcast service multicast/broadcast service in accordance with an example embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

In the present disclosure, elements may be described as "configured to" to perform one or more actions or operations or "configured for" such actions or operations. In general, an apparatus that is configured to perform or configured for performing actions or operations, or is enabled to perform the actions or operations, or is suitable for performing the action or operations, or is adapted to perform the actions or operations, or is operable to perform the actions or operations, or is otherwise capable of performing the actions or operations.

It is understood that for the purposes of the present disclosure, language of "at least one of X, Y, and Z" and "one or more of X, Y, and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

For simplicity and clarity of illustrating, reference numerals may be repeated among the figures to indicate corresponding or analogous elements. Numerous details are set forth to provide an understanding of the implementations described herein. The implementations may be practiced without these details. In other instances, well-known methods, procedures, components, and entities have not been described in detail to avoid obscuring the implementations described. The present disclosure is not to be considered as limited to the scope of implementations described herein.

The $3^{rd}$ Generation Partnership Project (3GPP) has developed various technical standards that specify architectures and protocols for mobile telecommunication networks. Clause 5.18 of Technical Specification (TS) 23.501 of the 3GPP standard describes the architecture for a mobile telecommunication network (referred to as a 5G multi-operator core network (5G MOCN)) which includes multiple 5th generation core networks (5GCs) of different public land mobile networks connected to radio access network nodes (e.g., gNBs) of the same next-generation radio access network (NG-RAN). FIG. 1 shows a mobile telecommunication network comprising two public land mobile networks (public land mobile network A (PLMN A) and public land mobile network B (PLMN B) connected to (e.g., sharing) one or more radio access network (RAN) nodes of a next generation radio access network (NG-RAN). PLMN A and PLMN B, each comprises a core network to handle a multicast/broadcast service (MBS) broadcast data and control signalling (MB-SMF A and MB-SMF B, AMF A and AMF B, respectively for PLMN A and PLMN B). In FIG. 1, a user equipment is attached to PLMN A (UE of PLMN A in FIG. 1), and a user equipment is attached to PLMN B (UE of PLMN B). An AF (AF A) is connected to each PLMN (e.g., AF A is connected to PLMN A and AF B is connected to PLMN B). Each AF may create an MBS session for a MBS service by following steps of the MBS Session Creation Procedure without PCC described in Clause 7.1.1.2 or 7.1.1.3 of TS 23.247 of the 3GPP standard. Although two AFs are shown connected to the two PLMNs in FIG. 1, in some embodiments, one AF may be connected to the two PLMNs.

3GPP TS 23.247, solution 24 describes a solution for providing an MBS service via multiple PLMNs sharing one or more RAN nodes. 3GPP TS 23.247, solution 24 states "This solution relies on RAN configuration does not need any new parameter as proposed in existing solutions but the service-id part of the TMGI of the RAN sharing partners that corresponds to the same content is configured in RAN. For example, if PLMNs with MCC=234, MNC=15 (operator A) and MCC=234, MNC=10 (operator B) are doing MBS RAN sharing, the corresponding RAN nodes are already configured with the PLMN-ids of each of the sharing partner and can be configured with the specific respective service-id (6 digits numbers) of the TMGIs of two PLMNs that correspond to the same content or even range of service-ids. For instance, service-id=123456 (for operator A) and service-id=001234 (for operator B) corresponds to content from "TV channel X". This means that the corresponding MB-SMF in each PLMN will allocate the service ids for the TMGI based on the specific range expected for the same content. Then the RAN node can populate accordingly the MCCH with the respective TMGI of the RAN sharing partners. Based on rel. 17 RRC encoding, it is possible to have common MTCH configuration and same G-RNTI mapped to different TMGIs. Based on RAN OAM configuration, it is possible to identify which TMGIs (belonging to different PLMNs in this case) providing same broadcast service. In the service announcement for the broadcast MBS sessions delivering the same content, the respective MBSFs of each PLMN can indicate the PLMN specific TMGI to the UEs."

One drawback of 3GPP TS 23.247, solution 24 is that the solution requires the identifier of an AF (referred to as afID) to be passed to the MB-SMF in each PLMN participating in providing a shared MBS service. A further drawback of 3GPP TS 23.247, solution 24 is that the solution involves a NEF and a AF in allocation of TMGIs which can lead to conflicts with MB-SMF procedures for allocation of TMGIs.

According to an aspect of the present disclosure, an AF is configured with an index value to be used for each shared MBS service based on agreement between an operator of a PLMN (generally referred to as a PLMN) and a content provider operating the AF. For shared MBS services, in a TMGI allocation request, the AF includes one index number or several index numbers and sends the TMGI allocation request including the one index number or several index numbers to. In each PLMN, an MB-SMF selects one or more TMGIs out of a configured list or range of TMGIs for shared MBS services according to the received index value (s) and returns those TMGI(s) to the AF. The AF triggers a creation of the MBS session for the shared MBS service in each PLMN participating in providing the shared MBS service using the TMGI allocated for that PLMN, and in each PLMN the corresponding MB-SMF requests the start of the MBS session at involved RAN nodes (i.e., RAN nodes that are shared by the PLMNs) via AMF(s) and provide the TMGI for the MBS session in that PLMN according to existing procedures specified in clause 7 of TS 23.247 of Release 17 of the 3GPP standard. The involved RAN nodes are pre-configured for each PLMN participating in shared MBS services with a list or range of TMGIs for shared MBS services and identify the MBS sessions from different PLMNs (one list per one PLMN) that relate to the same shared MBS service by mapping TMGIs from the configured lists or ranges of TMGIs to each other based on their position in the lists or ranges of TMGIs (i.e., mapping the 1st TMGIs from the list or range of TMGIs to each other, the 2nd TMGIs from the list or ranges of TMGIs to each other, and so on).

According to another aspect of the present disclosure, only one MB-SMF (e.g., MB-SMF A) in one PLMN (e.g., PLMN A) manages allocation of TMGIs from a list or range of TMGIs for shared MBS services. The MB-SMF that manages allocation of TMGIs from a list or range of TMGIs for shared MBS services is referred to as a lead-MB-SMF. Whenever a shared MBS service is created, the lead MB-SMF (e.g., MB-SMF A) obtains an indication that the TMGI is for a shared MBS service and can freely select a TMGI (e.g., TMGI A) from the list or range of TMGIs for shared MBS services configured in a PLMN (e.g., PLMN A). A MB-SMF of another PLMN (e.g., MB-SMF B of PLMN B, which is generally referred to as a non-lead MB-SMF) is pre-configured with a mapping for each TMGI included in the list or range of TMGIs for shared MBS services of PLMN A to a TMGI in PLMN B for the same MBS shared service. When an AF sends a request for TMGI allocation for a shared MBS service towards MB-SMF B, the AF includes the TMGI A allocated by PLMN A in the request for TMGI allocation, and MB-SMF B selects the corresponding TMGI B for PLMN B based on the pre-configured mapping. The AF then triggers creation of a MBS session for the shared MBS service in each PLMN participating in providing the shared MBS service using the TMGI allocated for that PLMN, and in each PLMN the corresponding MB-SMF then requests the start of the MBS session at involved RAN nodes (i.e., the RAN nodes that are shared by the PLMNs) via AMF(s) and provides the selected TMGI for the MBS session in that PLMN according to existing procedures specified in clause 7 of TS 23.247 of Release 17 of the 3GPP standard. The involved RAN nodes are also pre-configured with a mapping between the TMGIs for shared MBS services used in the different PLMNs. When receiving requests to create MBS sessions from different PLMNs, a RAN node of the involved RAN nodes identifies the shared MBS service via the configured mapping and broadcasts data (e.g., media) of the shared MBS service only once. In some embodiments, a RAN node is pre-configured for each PLMN with a list or range of TMGIs for shared MBS services and map TMGIs with the same position within the pre-configured lists or ranges of TMGIs to each other.

According to another aspect of the present disclosure, a database shared by the multiple PLMNs for shared MBS services stores, for each PLMN, TMGIs per MBS service identifier (generally referred to as service ID) and/or an identifier of an application function (generally referred to as AF identifier or AF ID). The database is to be contacted by MB-SMF when the MB-SMF is allocating TMGIs. Service ID(s) and/or AF ID is provided in addition from an AF to an MB-SMF when the AF is requesting TMGIs from an MB-SMF.

Figure 2:
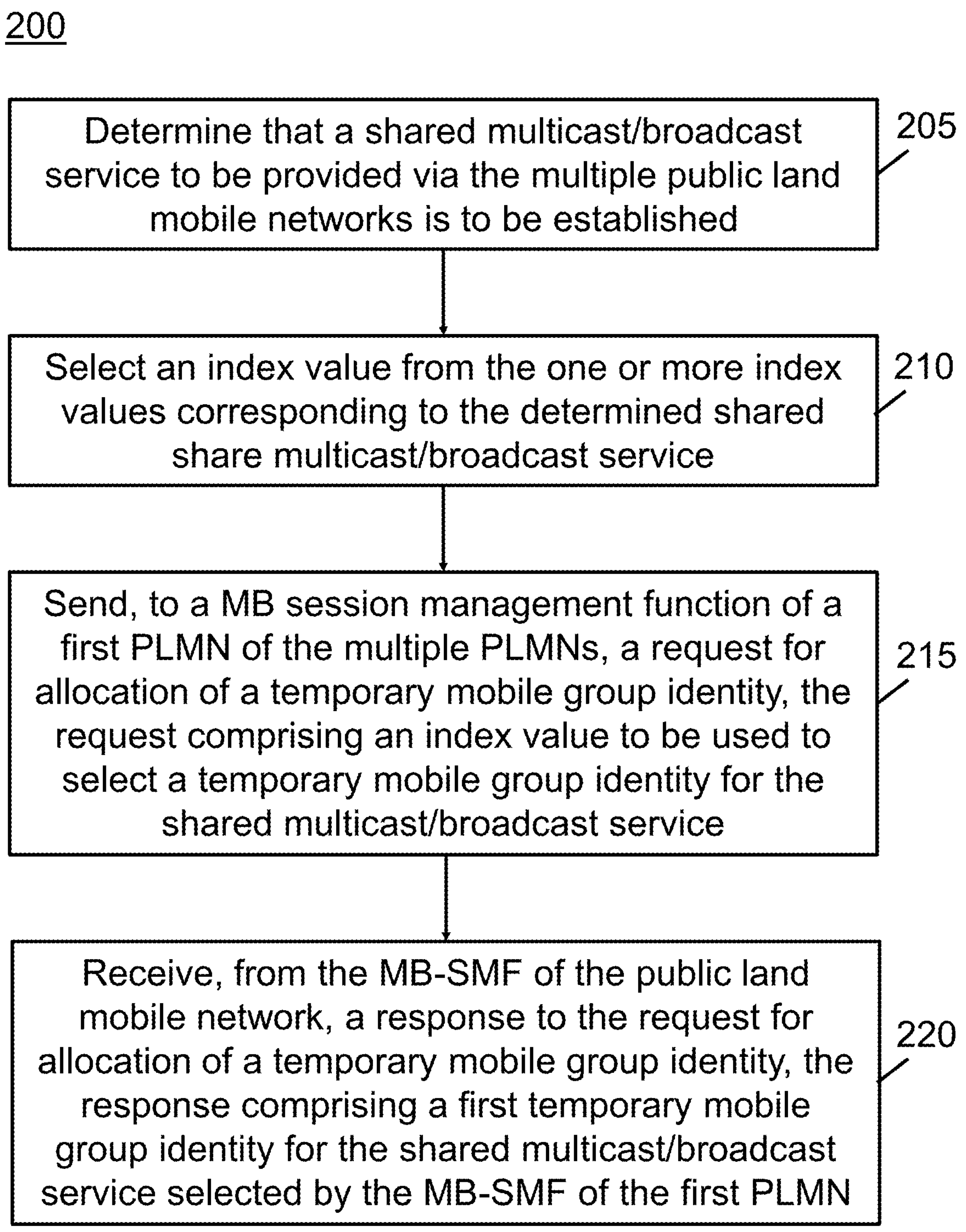
FIG. 2 is a flowchart of a method performed by an application function providing a shared multicast/broadcast service via the multiple public land mobile networks sharing a radio access network node of a next generation radio access network in accordance with an example embodiment of the present disclosure.

Reference is now made to FIG. 2 to describe an example embodiment of a method 200 performed by an application function (AF) (e.g., AF A s or AF B shown in FIG. 1) of the mobile telecommunication network of FIG. 1 for providing one or more shared MBS services via multiple PLMNs sharing one or more RAN nodes of a NG-RAN. The AF may be pre-configured with one or more index values, where each index value of the one or more index values corresponds to a shared multicast/broadcast service to be provided via the multiple public land mobile networks that are sharing the one or more RAN nodes of the NG-RAN. The pre-configuration may be performed for instance via an administrative interface of the AF. If the AF handles multiple shared MBS services, the pre-configuration contains a specific index value for each of the multiple shared MBS services. The AF may be configured to perform the method 200.

The method 200 begins at 205 where the AF determines that a shared MBS to be provided via the multiple public land mobile networks is to be established. The method 200 then proceeds to 210.

At 210, the AF selects an index value from the one or more index values corresponding to the identified shared share multicast/broadcast service. The method 200 the proceeds to 215. At 215, the AF sends, to a multicast/broadcast session management function of a first public land mobile network of the multiple public land mobile networks, a request for allocation of a temporary mobile group identity, the request comprising an index value to be used to select a temporary mobile group identity for the shared multicast/broadcast service. The request for allocation of a temporary mobile identifier may be a temporary mobile group identity request or a multicast/broadcast service creation request.

The method 200 the proceeds to 220. At 220, the AF receives, from the multicast/broadcast session management function of the public land mobile network, a response to the request for allocation of a temporary mobile group identity, the response comprising a first temporary mobile group identity for the shared multicast/broadcast service selected by the session management function of public land mobile network.

Figure 3:
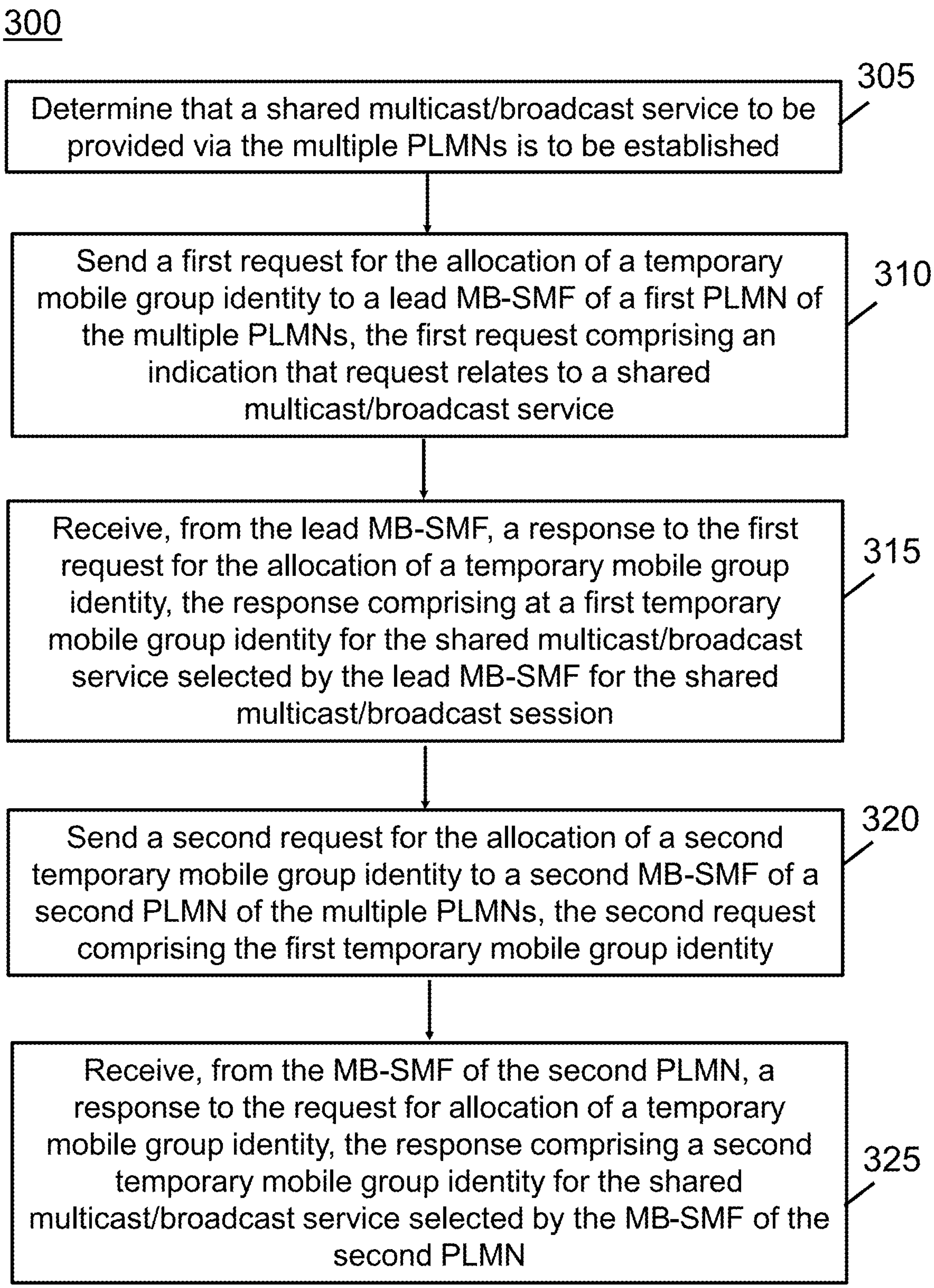
FIG. 3 is a flowchart of a method performed by an application function providing a shared multicast/broadcast service via multiple public land mobile networks sharing a radio access network node of a next generation radio access network in accordance with another example embodiment of the present disclosure.

Although the method 200 is described as being performed by an AF, in an alternative embodiment, the method 200 may be carried out by an apparatus when at least one processor of the apparatus executes instructions for providing an MBS service via multiple PLMNs sharing one or more RAN nodes of a NG-RAN. In this alternative embodiment, a memory of the apparatus may store or comprise one or more index values, where each index value of the one or more index values corresponds to a shared multicast/broadcast service to be provided via the multiple public land mobile networks that are sharing the one or more RAN nodes of the NG-RAN and instructions which, when executed by the at least one processor of the apparatus causes the apparatus to carry out the method 200. Reference is now made FIG. 3 to describe another example embodiment of a method 300 performed by an application function (AF) (e.g., AF A s or AF B shown in FIG. 1) of the mobile telecommunication network of FIG. 1 for providing an MBS service via multiple PLMNs sharing one or more RAN nodes of a NG-RAN. The AF may be pre-configured with one or more index values, where each index value of the one or more index values corresponds to a shared multicast/broadcast service to be provided via the multiple public land mobile networks that are sharing the one or more RAN nodes of the NG-RAN. The AF may be configured to perform the method 300.

The method 300 begins at 305. At 305, the AF sends a first request for the allocation of a temporary mobile group identity to the lead MB-SMF of a PLMN of the multiple PLMNs. The first request comprises an indication that the request relates to a shared multicast/broadcast service. The method 300 then proceeds to 310. At 310, the AF receives, from the lead MB-SMF, a response to the first request for the allocation of a temporary mobile group identity, the response comprising at a first temporary mobile group identity for the shared multicast/broadcast service selected by the lead MB-SMF for the shared multicast/broadcast session. The method 300 then proceeds to 315. At 315, the AF sends a second request for the allocation of a second temporary mobile group identity to a second MB-SMF of a second PLMN of the multiple PLMNs. The second request comprises the first temporary mobile group identity for the shared multicast/broadcast service. The method 300 then proceeds to 320. At 320, the AF receives from the second MB-SMF of the second PLMN a response to the request for allocation of a temporary mobile group identity. The response comprises a second temporary mobile group identity for the shared multicast/broadcast service selected by the second MB-SMF of the second PLMN.

Figure 4:
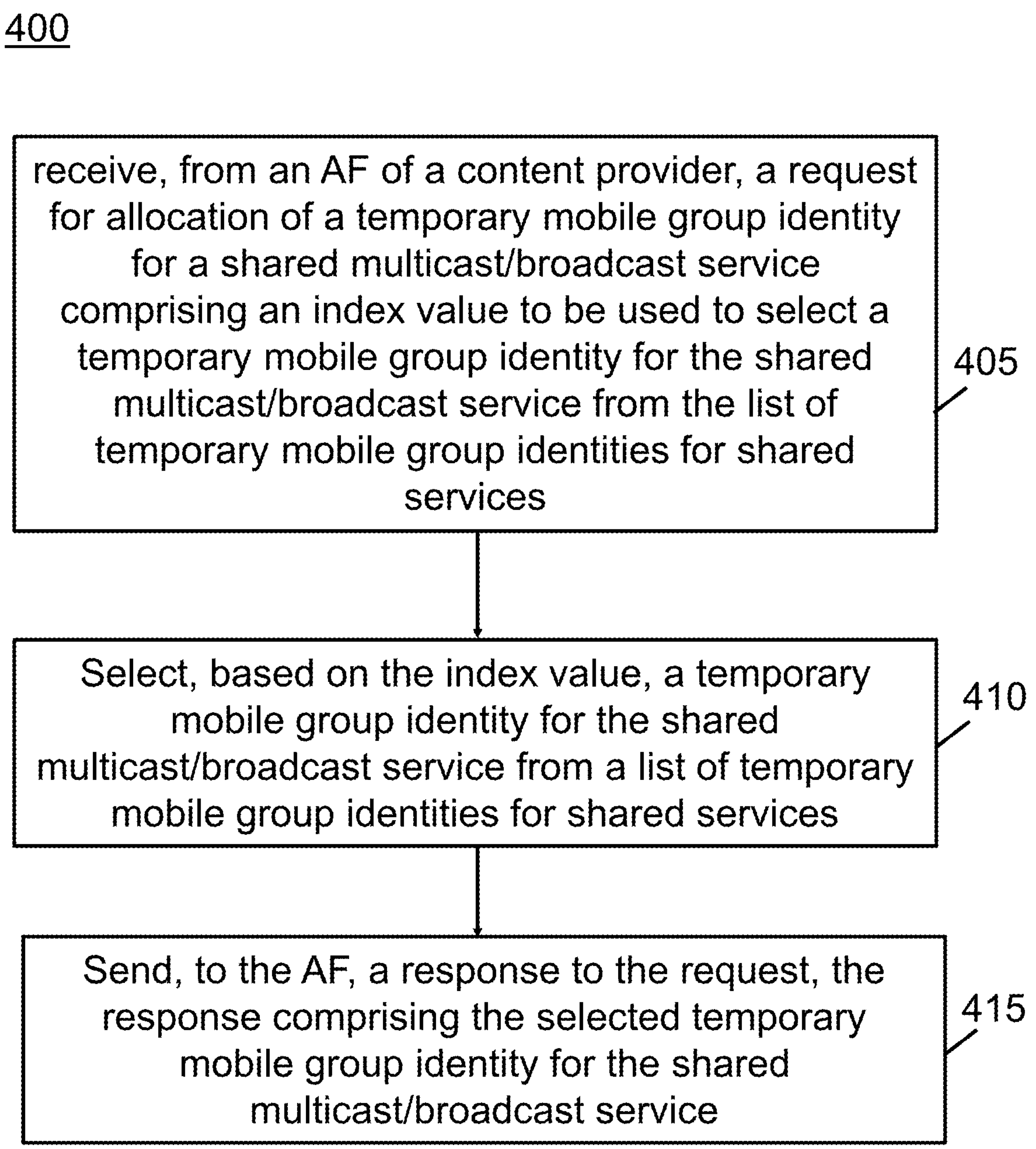
FIG. 4 is a flowchart of a method performed by a multicast/broadcast service session management function of a core network of a public land mobile network of multiple public land mobile networks sharing a radio access network node of a next generation radio access network in accordance with example embodiment of the present disclosure.

Reference is now made to FIG. 4 to describe an example embodiment of a method 400 performed by an MB-SMF of a PLMN of the mobile telecommunication network of FIG. 1 which participates in providing a shared multicast/broadcast service. In this example embodiment, the MB-SMF is configured with a list or range of temporary mobile group identities (TMGIs) for shared multicast/broadcast services to be broadcasted via the multiple public land mobile networks that are sharing the one or more radio access network nodes of the NG-RAN. The MB-SMF is also configured to perform the method 400. The method 400 begins at 405 where the MB-SMF receives, from an AF of a content provider (e.g., the AF A or AF B or FIG. 1), a request for allocation of a temporary mobile group identity for a shared multicast/broadcast service, where the request comprises an index value to be used to select a temporary mobile group identity for the shared multicast/broadcast service from the list of temporary mobile group identities for shared services. The index value represents the numerical position of a particular temporary mobile group identifier in the list or range of temporary mobile group identifiers for shared multicast/broadcast services. The method 400 then proceeds to 410. At 410, the MB-SMF selects, based on the index value, a temporary mobile group identity for the shared multicast/broadcast service from a list of temporary mobile group identities for shared services. The method 400 then proceeds to 415. At 415, the MB-SMF sends, to the AF, a response to the request where the response includes the selected temporary mobile group identity for the shared multicast/broadcast service.

Figure 5:
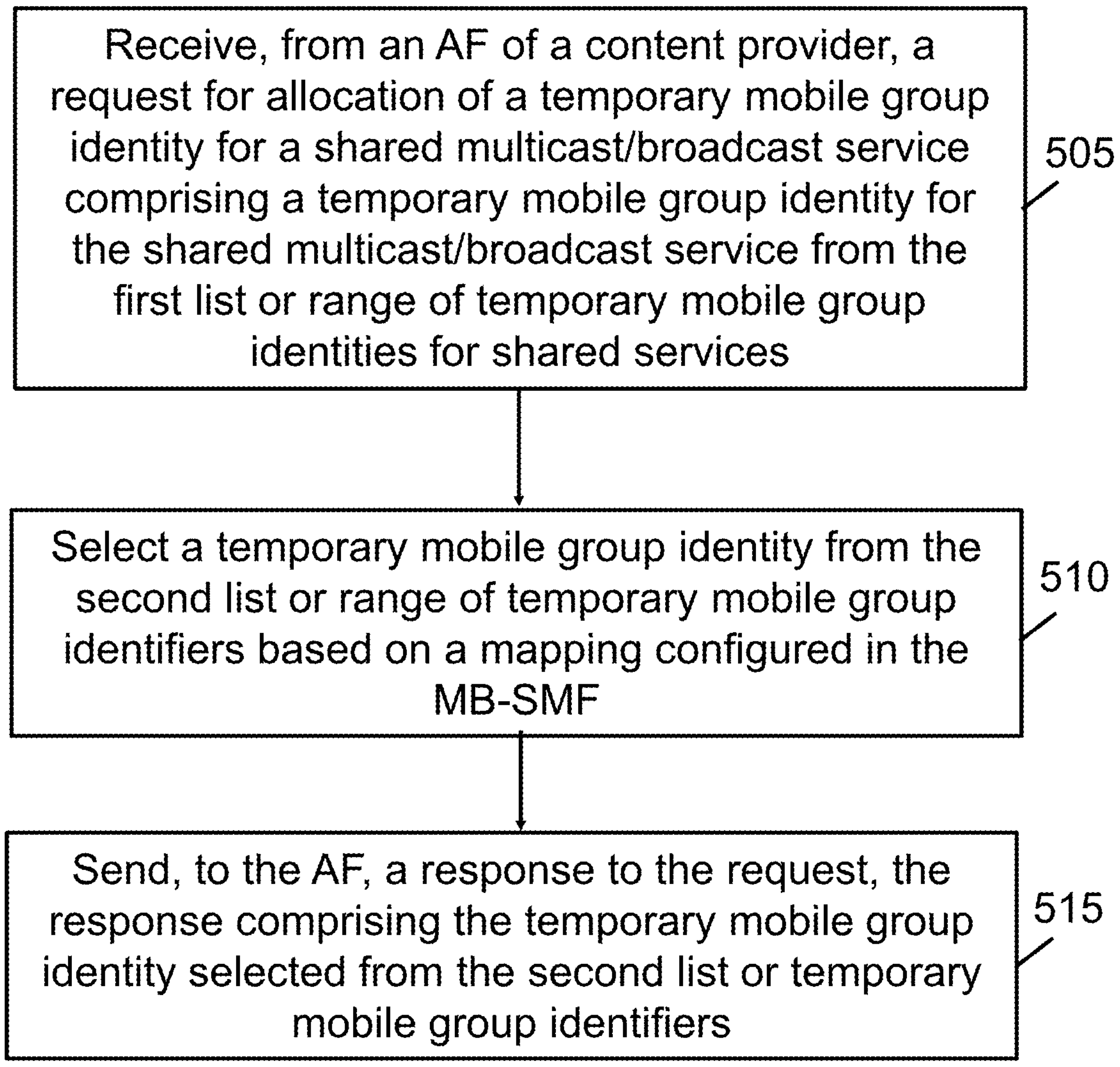
FIG. 5 is a flowchart of a method performed by a multicast/broadcast service session management function of a core network of a public land mobile network of multiple public land mobile networks sharing a radio access network node of a next generation radio access network in accordance with another example embodiment of the present disclosure.

Reference is now made to FIG. 5 to describe an example embodiment of a method 500 performed by an MB-SMF of a PLMN of the mobile telecommunication network of FIG. 1 which participates in providing a shared multicast/broadcast service. The MB-SMF is configured with a mapping of a first list or range of temporary mobile group identities (TMGIs) to second list or range of temporary mobile group identities. The MB-SMF may be configured with the mapping by an operation and maintenance subsystem of the PLMN. In the mapping, each TMGI in the first list or range of TMGIs is mapped to, associated with, or linked to one TMGI in the second list or range of TMGIs. Each TMGI is to be used for a particular shared multicast/broadcast service. The MB-SMF is also configured to perform the method 500. The method 500 begins at 505 where the MB-SMF receives, from an AF of a content provider (e.g., the AF A or AF B or FIG. 1), a request for allocation of a temporary mobile group identity for a shared multicast/broadcast service. The request includes a temporary mobile group identity of the first list or range of temporary mobile group identities (TMGIs). The method 500 then proceeds to 510. At 510, the MB-SMF selects a temporary mobile group identity from the second list or range of temporary mobile group identifiers based on the mapping configured in the MB-SMF. The method 500 then proceeds to 515. At 515, the MB-SMF sends a response to the request for the allocation of a temporary mobile group identity. The response includes the temporary mobile group identity from the second set of temporary mobile group.

Figure 6:
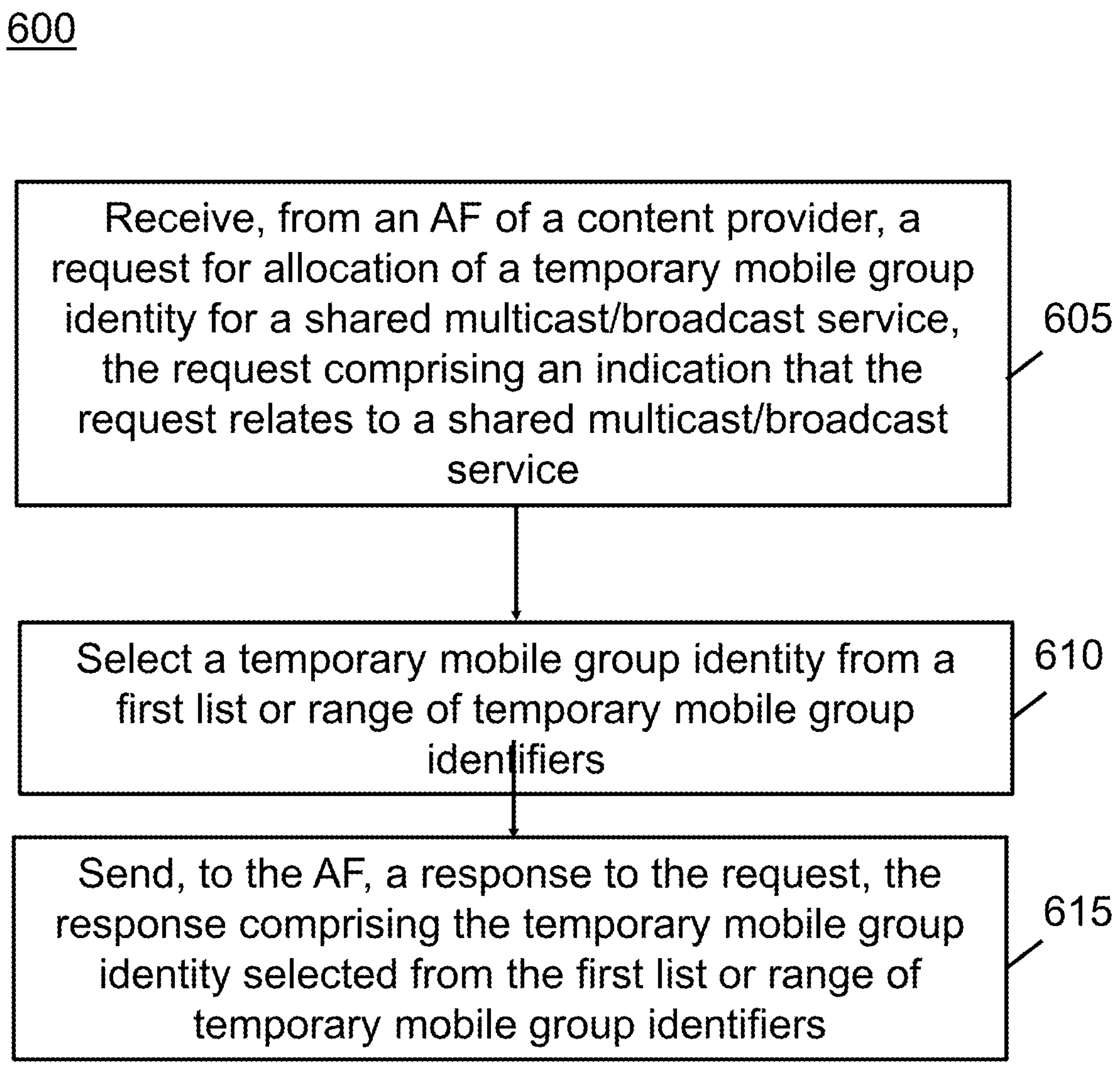
FIG. 6 is a flowchart of a method performed by a multicast/broadcast service session management function of a core network of a public land mobile network of multiple public land mobile networks sharing a radio access network node of a next generation radio access network in accordance with another example embodiment of the present disclosure.

Reference is now made to FIG. 6 to describe an example embodiment of a method 600 performed by an MB-SMF of a PLMN of the mobile telecommunication network of FIG. 1 which participates in providing a shared multicast/broadcast service. In this example embodiment, the MB-SMF is configured with a first list or range of temporary mobile group identities (TMGIs) for shared multicast/broadcast services to be broadcasted via the multiple public land mobile networks that are sharing the one or more radio access network nodes of the NG-RAN. The MB-SMF is also configured to perform the method 600. The method 600 begins at 605 where the MB-SMF receives, from an AF of a content provider (e.g., the AF A or AF B or FIG. 1), a request for allocation of a temporary mobile group identity for a shared multicast/broadcast service where the request comprises an indication that the request relates to a shared multicast/broadcast service. The method 600 then proceeds to 610. At 610, the MB-SMF selects a temporary mobile group identity for the shared multicast/broadcast service from the list of temporary mobile group identities for shared services. The method 600 then proceeds to 615. At 615, the MB-SMF sends, to the AF, a response to the request, where the response includes the selected temporary mobile group identity for the shared multicast/broadcast service.

Figure 7:
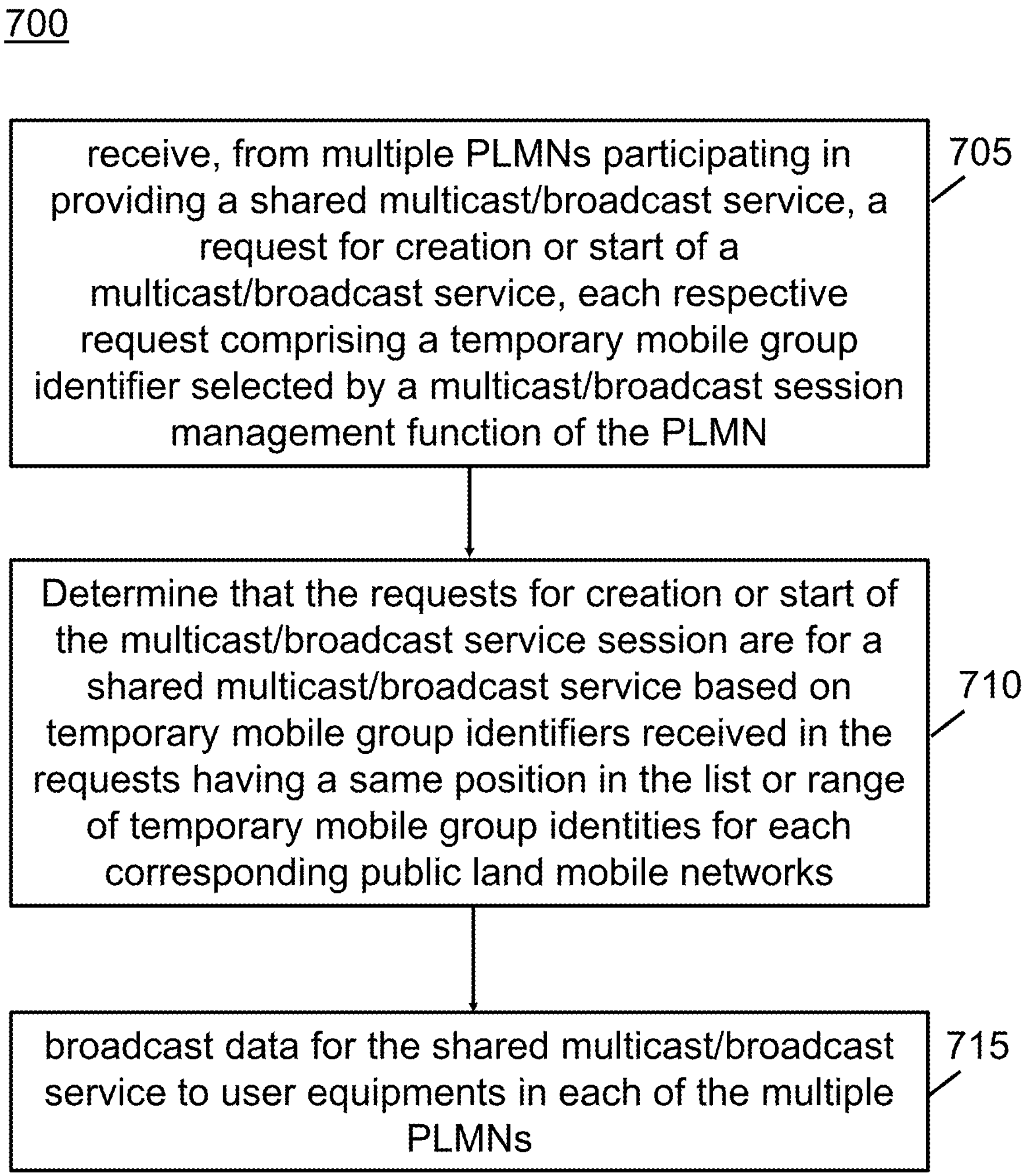
FIG. 7 is a flowchart of a method performed by an apparatus of a next generation radio access network node of a radio access network shared by core networks of multiple public land mobile networks in accordance with an example embodiment of the present disclosure.

Reference is now made to FIG. 7 to describe an example embodiment of a method 700 performed by apparatus of an NG-RAN node shared by the PLMNs of the mobile telecommunication network of FIG. 1. The method 700 begins at 605. At 705, the NG-RAN node receives from multiple PLMNs participating in providing a shared multicast/broadcast service, a request for creation or start of a multicast/broadcast service, each respective request comprising a temporary mobile group identifier selected by a multicast/broadcast session management function of the PLMN. The method 700 then proceeds to 710. At 710, the NG-RAN node determines that the requests for creation or start of the multicast/broadcast service session are for a shared multicast/broadcast service based on temporary mobile group identifiers received in the requests having a same position in the list or range of temporary mobile group identities for each corresponding public land mobile networks. The method 700 then proceeds to 715. At 715, the NG-RAN node broadcasts data for the shared multicast/broadcast service to user equipments in each of the multiple PLMNs.

Figure 8:
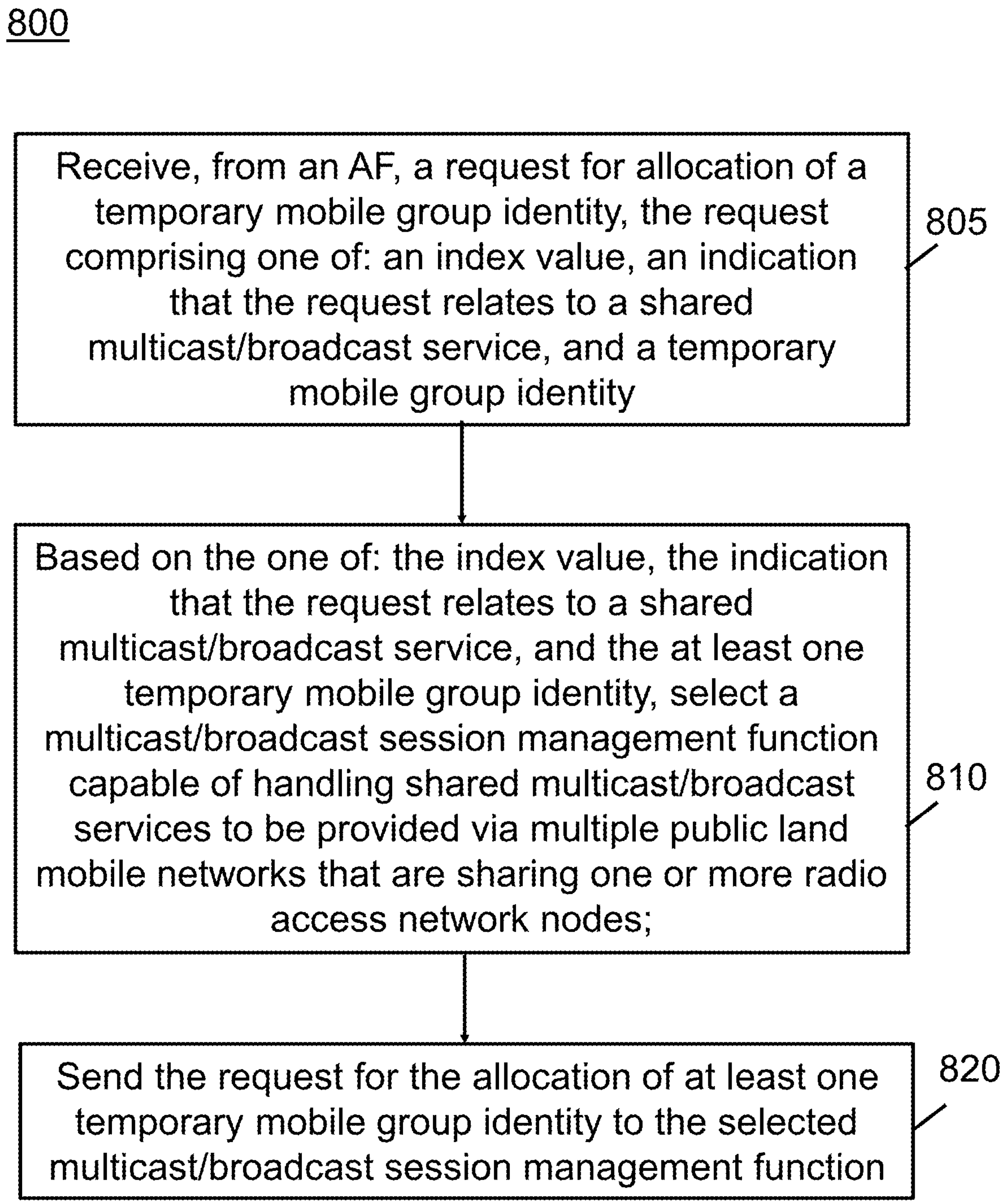
FIG. 8 is a flowchart of a method performed by a next exposure function of a core network of a public land mobile network of multiple public land mobile networks sharing a radio access network node of a next generation radio access network in accordance with example embodiment of the present disclosure.

Reference is now made to FIG. 8 to describe an example embodiment of a method 800 performed by NEF (e.g., NEF A or NEF B) of a PLMN of the mobile telecommunication network of FIG. 1. The method 800 begins at 805. At 805, the AF receives a request for allocation of a temporary mobile group identity from an application function. The request comprises one of: an index value, an indication that the request relates to a shared multicast/broadcast service, and a temporary mobile group identity. The method 700 then proceeds to 805. At 805, the NEF selects a multicast/broadcast session management function capable of handling shared multicast/broadcast services to be provided via multiple public land mobile networks that are sharing one or more radio access network nodes based on the one of: the index value, the indication that the request relates to a shared multicast/broadcast service, and the at least one temporary mobile group identity. The method 800 then proceeds to 815. At 815, the NEF send the request for allocation of at least one temporary mobile group identity to the selected multicast/broadcast session management function.

Figure 9:
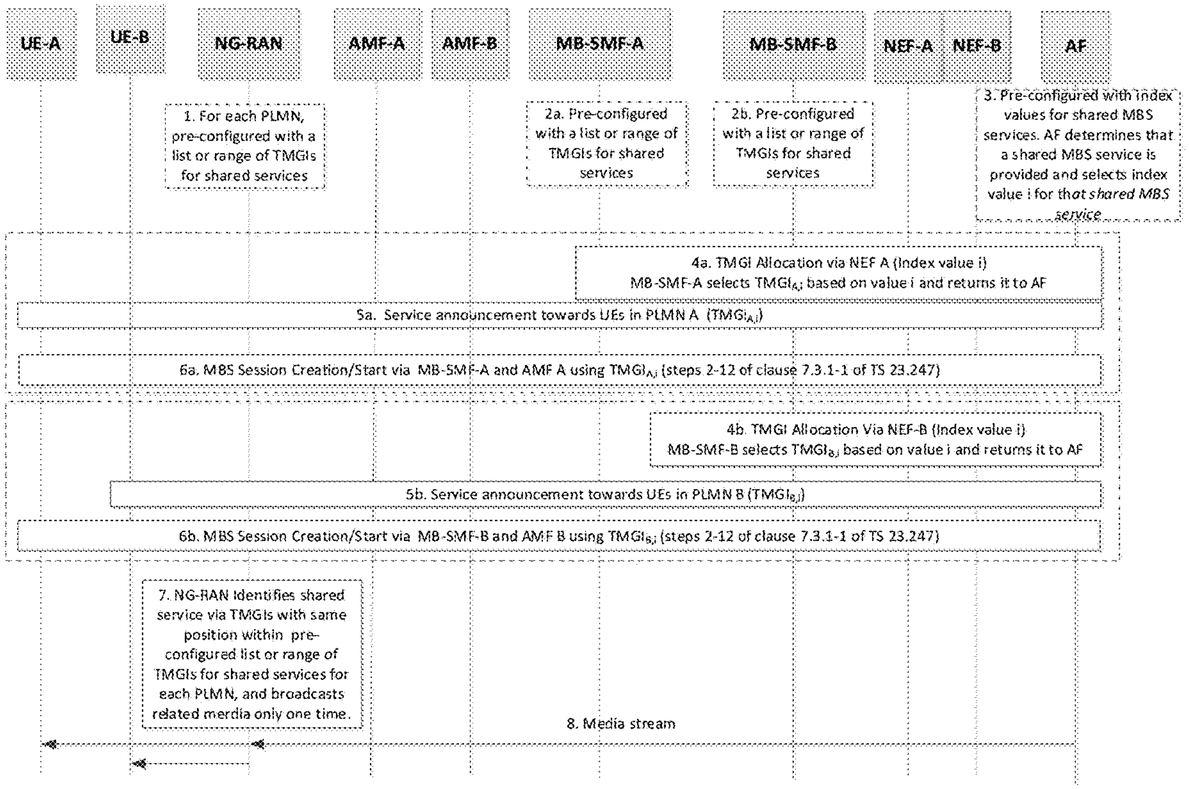
FIG. 9 is a diagram showing a procedure for the mobile telecommunication network of FIG. 1 for providing multicast/broadcast services in accordance with example embodiment of the present disclosure.

Reference is now made to FIG. 9, to describe a procedure for the mobile telecommunication network of FIG. 1 for providing MBS services in accordance with example embodiment of the present disclosure is shown. In FIG. 9, the procedure involves operations and sub-procedures performed by various entities of the mobile telecommunication network of FIG. 1, including the AF, the NEF, MB-SMF A, MB-SMF B, and the NG-RAN node.

The procedure shown in FIG. 9 begins at 1. At 1, a radio access network (RAN) node of a next generation RAN (e.g., a radio access network node operating in accordance with 5$^{th}$ generation radio access technology defined in the 3GPP specification) is pre-configured for each PLMN (e.g., PLMN A and PLMN B) that participates in providing shared multicast/broadcast services with a list or range of (TMGIs) for the shared multicast/broadcast services. The pre-configuration of the RAN node may be done without any knowledge of any particular shared multicast/broadcast services that is to be provided by PLMN A and PLMN B.

At 2*a*, PLMN A which participates in providing shared services, MB-SMF is pre-configured with a list or range of TMGIs for shared services. This pre-configuration can be done without knowledge of any particular shared service.

At 3, an AF which controls a shared MBS service is configured with an index value i for each shared MBS service. The AF interacts with all PLMNs over which the shared MBS service is provided. Although FIG. 7 shows only one AF, in some implementations, separate AFs interact with each PLMN over which the shared MBS service is provided.

At 4*a*, the AF requests allocation of at least one TMGI in PLMN A over which a shared MBS service is to be provided. The AF requests allocation of at least one TMGI in PLMN A over which a shared MBS service is to be provided by sending a request for TMGI allocation to a network exposure function (e.g., NEF A). The request for TMGI allocation may be a TGMI allocation request (as shown steps 1 to 6 of FIG. 7.1.1.2-1 of TS 23.247). The TMGI allocation request includes one index number i for a shared MBS service or several index numbers (or a range of index numbers) for shared MBS services. In some implementations, the AF may request allocation of at least one TMGI in PLMN A over which a shared MBS service is to be provided by sending, to a network exposure function (e.g., NEF A), a request for MBS session creation (steps 8, 11, 16 and 20 of FIG. 7.1.1.2-1 of TS 23.247) that includes one index number i for a shared MBS service or several index numbers (or a range of index numbers) for shared MBS services one index number i for a shared MBS service or several index numbers (or a range of index numbers) for shared MBS services.

The AF addresses a NEF in the PLMN that in turn selects and contacts an MB-SMF. In some implementations it may be possible that, specific MB-SMFs are configured to handle shared MBS services. The NEF selects one of the MB-SMFs configured to handle shared MBS services after receipt of a request for TMGI allocation or service creation with an index value. The information whether an MB-SMF supports shared MBS services may be stored in the NRF and may be looked up by the NRF during the MB-SMF selection.

In each PLMN, MB-SMF selects for each received index number a TMGI by looking up the TMGI indicated by the index number from a pre-configured list or range of TMGIs for shared services and returns the selected TMGI to the AF. The MB-SMF may either be configured with list or range or look it up from a database where that information is stored. If several TMGIs are returned, they are provided in a way that indicates which TMGI relates to which index value, for instance by providing the TMGI values in the same order as the received index values.

The MB-SMF may store for each index value whether the related TMGI is already allocated and if it receives another request for TMGI allocation, return an error.

At 5*a* and 5*b*, the AF uses the received TMGI for service announcements about the MBS service towards UEs in the PLMN (e.g., PLMN A and PLMN B) from which the TMGI was received.

At 6*a*, 6*b*, the AF uses the received TMGI when requesting creation, modification and/or termination of the MBS service in the PLMN from which the TMGI was received.

The AF triggers creation of the MBS session for the shared MBS service in each PLMN providing the shared MBS service using the TMGI allocated for that PLMN, and in each PLMN the corresponding MB-SMF then request the start of the MBS session at involved RAN nodes via AMF(s) and provides the TMGI for the MBS session in that PLMN according to existing procedures described in clauses 7.11.2, 7.1.1.3 of TS 23.247 of the 3GPP standard.

At 7, a NG-RAN node identifies a shared MBS service via TMGIs with same position within a pre-configured list or range of TMGIs for shared services for each PLMN.

At 8, the AF sends a media stream comprising content for the shared MBS service towards each PLMN providing the shared MBS service. The shared NG RAN node receives one or multiple copies of the data for the shared service (from each PLMN), but broadcasts only one copy of the data (e.g., content or media) in each radio cell. UEs attached to any PLMN participating in the shared service camping in such a radio cell can receive the data (e.g., content or media).

Figure 10:
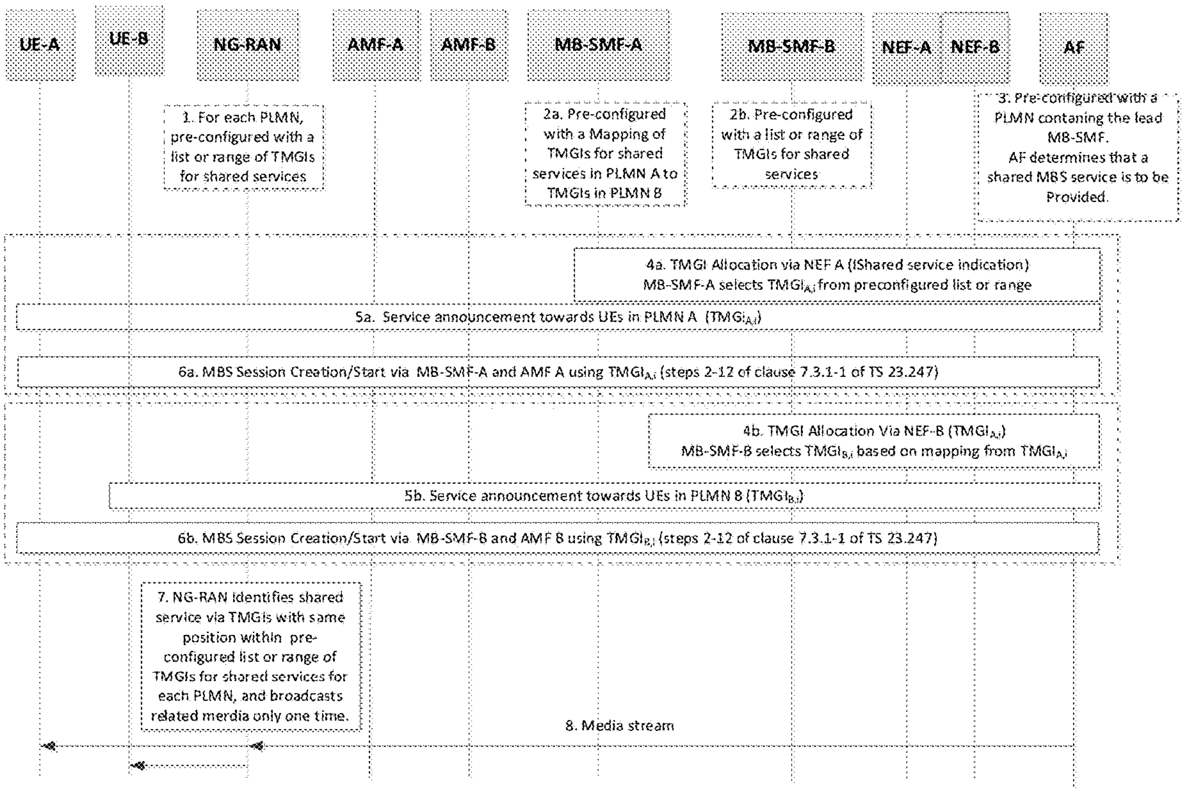
FIG. 10 is a diagram showing is a diagram showing a procedure for the mobile telecommunication network of FIG. 1 for providing multicast/broadcast services in accordance with another example embodiment of the present disclosure.

Reference is now to made FIG. 10, to describe a procedure for the mobile telecommunication device of FIG. 1 for providing MBS services in accordance with example implementation of the present disclosure is shown. In FIG. 10, the procedure involves operations and sub-procedures performed by various entities of the mobile telecommunication network of FIG. 1, including the AF, the NEF, MB-SMF A, MB-SMF B, and the NG-RAN node.

At 1, the NG-RAN node is pre-configured for each PLMN that can participate in shared MBS services with a list or range of TMGIs for shared MBS services. The NG-RAN node may be pre-configured for each PLMN that can participate in shared MBS services with a list or range of TMGIs for shared MBS services without knowledge of any particular shared MBS service.

At 2*a*, a MB-SMF in one of the PLMNs manages allocation of TMGIs from a list or range of TMGIs for shared MBS services. The MB-SMF (e.g., MB-SMF A) in the PLMN that manages allocation of TMGIs for shared MBS services is called the lead MB-SMF. The lead MB-SMF may be configured with a list or range of TMGIs for shared MBS services or the lead MB-SMF may look obtain a list or range of TMGIs for shared MBS services from a database where the list or range of TMGIs for shared MBS services is stored.

At 2*b*, a MB-SMF in another PLMN of the PLMNs (e.g., MB-SMF B of PLMN B) is pre-configured with a mapping for each TMGI included in the list or range of TMGIs for shared MBS services of PLMN A with a mapping to a TMGI value in PLMN B for the same shared MBS service or look that mapping up in a database where the mapping is stored. For instance, MB-SMF B may be configured with the list or range of TMGI values for PLMN A and a list or range of TMGI values for PLMN B and map the TMGI values of PLMN A to TMGI values of PLMN B according to their position in the corresponding list or ranges for PLMN A and PLMN B.

At 3, one AF interacts with all PLMNs over which the shared MBS service is provided. In some implementations separate AFs may interact with the PLMNs. The AF(s) are configured with information about the PLMN A where the lead MB-SMF is located. The AF decides to establish a shared MBS service.

At 4*a*, the AF request the TMGI allocation first in that PLMN A and provides an indication that the requested TMGI is for a shared service. The request for TMGI allocation may be a separate request (as shown in the figure, steps 1 to 6 of FIG. 7.1.1.2-1 of TS 23.247) or be combined with the request for MBS session creation (steps 8, 11, 16 and 20 of FIG. 7.1.1.2-1 of TS 23.247). The AF addresses a NEF in the PLMN that in turn selects and contacts an MB-SMF. In some embodiments, specific MB-SMFs may be configured to handle shared services. In that case, the NEF select one of these MB-SMFs when receiving a request for TMGI allocation or service creation with an indication that the request is for a shared service. The information whether an MB-SMF supports shared services may be stored in the NRF and may be looked up by the NRF during the MB-SMF selection. Whenever a shared MBS service is created, MB-SMF A obtains an indication that the TMGI is for a shared service and can freely select a not yet allocated TMGI A out of the list or range of TMGI values for shared services in PLMN A. It provides the allocated TMGI towards the AF.

In the embodiment where several AFs are involved, the AF interacting with PLMN A then provides the received TMGI A towards AF(s) interacting with other PLMN B(s) for the same shared MBS service.

At 4*b*, the AF that requests TMGI allocation for a shared service from a PLMN B without a lead MB-SMF, includes the TMGI A allocated by PLMN A in the corresponding request towards MB-SMF B.

The request for TMGI allocation may be a separate request (as shown in the figure, steps 1 to 6 of FIG. 7.1.1.2-1 of TS 23.247) or be combined with the request for MBS session creation (steps 8, 11, 16 and 20 of FIG. 7.1.1.2-1 of TS 23.247). The AF addresses a NEF in the PLMN that in turn selects and contacts an MB-SMF. Specific MB-SMFs may be configured to handle shared services. In that case, the NEF select one of these MB-SMFs when receiving a request for TMGI allocation or service creation with a TMGI A for a shared service. The information whether an MB-SMF supports shared services may be stored in the NRF and may be looked up by the NRF during the MB-SMF selection. MB-SMF B then selects the corresponding TMGI B for PLMN B based on the pre-configured mapping. MB-SMF-B is configured to only allocate a TMGI B that is mapped to a TMGI A when receiving the TMGI A. The MB-SMF B returns the allocated TMGI towards the AF.

At 5*a* and 5*b*, the AF uses the received TMGI for service announcements about the shared MBS service towards UEs in the PLMN from which the TMGI was received At 6*a*, 6*b*, the AF uses the received TMGI when requesting the creation, modification and/or termination of the shared MBS service in the PLMN from which the TMGI was received. The AF triggers creation of a MBS session for the shared MBS service in each PLMN participating in the shared MBS service using the TMGI allocated for that PLMN, and in each PLMN the corresponding MB-SMF then requests the start of the MBS session at the NG-RAN nodes that are shared by the PLMNs via AMF A and AMF B and provides the TMGI for the MBS session in that PLMN according to existing procedures described in clauses 7.1.1.2 and 7.1.1.3 of TS 23.247 of the 3GPP standard.

At 7, a NG-RAN node that is shared by the PLMNS are pre-configured with a mapping between the TMGIs for shared MBS services used in the different PLMNs. When the NG-RAN node receives a request to create MBS sessions from different PLMNs, the NG-RAN node identifies the shared MBB service via the pre-configured mapping between TMGIs applicable in different PLMNs. The mapping identifies set(s) of TMGIs, each set comprising, for each PLMN that can participate in providing shared MBS services, one TMGI, and each set being applicable for a shared MBS service. In some embodiments, a NG-RAN node may be pre-configured for each PLMN with a list or range of TMGIs for shared MBS services and map TMGIs with the same position within the pre-configured lists or ranges of TMGIs to each other.

At 8, the AF sends a media stream comprising content for the shared MBS service towards each PLMN providing the shared MBS service. The NG RAN node receives one or multiple copies of the data for the shared service, but broadcasts only one copy of the data in each radio cell. UEs attached to any PLMN participating in the shared service camping in such a radio cell can receive those data.

The apparatus and methods of the present disclose allow for the introduction of a new shared MBS service in a PLMN without the need for updates in configuration information for a MB-SMF and a RAN node. Further, configuring MB-SMFs and the RAN nodes that are sharing by the PLMNs participating in providing an MBS service with information about list or ranges of TMGIs for shared MBS services can be performed without knowledge of specific shared services.

Figure 11:
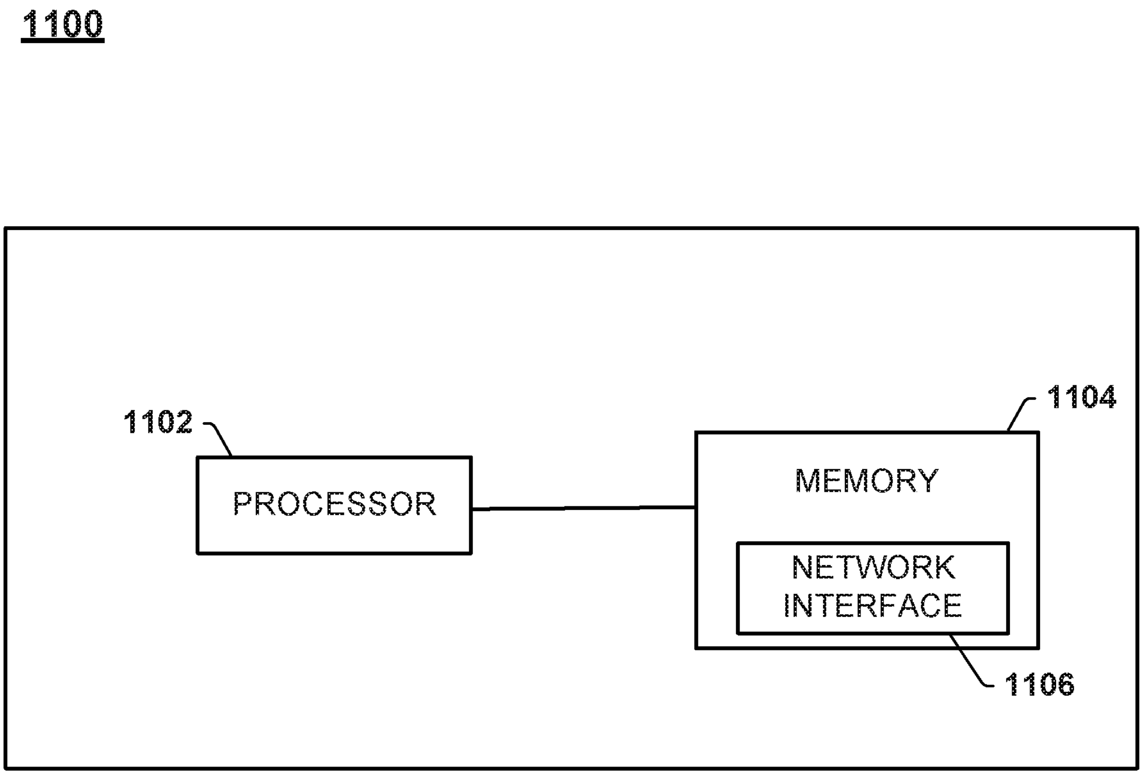
FIG. 11 is a schematic diagram illustrating various physical and logical components of an apparatus in accordance with some example embodiments described herein.

Reference is now made to FIG. 11 which shows various physical and logical components of an exemplary apparatus 1100 in accordance with an embodiment of the present disclosure. The apparatus 1100 may implement or comprises an AF of the mobile telecommunication system 100, one or more of the NFs (e.g., MB-SMF, AMF, NEF) of a PLMN of the mobile telecommunication system 100 or may be part of a shared NG-RAN node (e.g., gNB) of the mobile telecommunication system 100 (e.g., a RAN node that is shared by the PLMNs that are participating in providing an MBS service). Although an example embodiment of the apparatus 1100 is shown and discussed below, other embodiments may be used to implement examples disclosed herein, which may include components different from those shown. Although FIG. 11 shows a single instance of each component of the apparatus 1000, there may be multiple instances of each component shown The apparatus 1100 includes one or more processors 1102, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 1102 may collectively be referred to as a processor 1102. The apparatus 1100 may include a network interface 1106 configured for communicating with other apparatus of a mobile telecommunication network.

The apparatus 1100 includes one or more memories 1102 (collectively referred to as "memory 1102"), which may include a volatile or non-volatile memory (e.g., a flash memory, a random-access memory (RAM), and/or a read-only memory (ROM)). The non-transitory memory 1102 may store machine-executable instructions for execution by the processor 1102. A set of machine-executable instructions 1106 is shown stored in the memory 112, which may be executed by the processor 1102 to perform the actions of the methods 200, 300, 400, 500, 600, and 700 described herein. The memory 1102 may include other machine-executable instructions for execution by the processor 1102, such as machine-executable instructions for implementing an operating system, hypervisors, virtual machines and other applications or functions. The memory 1104 may also store data, the first and second lists or ranges of TMGIs, and the information described herein In some examples, the apparatus may also include one or more electronic storage units (not shown), such as a solid-state drive, a hard disk drive, a magnetic disk drive and/or an optical disk drive. In some examples, one or more datasets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable 4 memory storage. The storage units and/or external memory may be used in conjunction with memory 110 to implement data storage, retrieval, and caching functions of the apparatus 1100.

The components of the apparatus 1100 may communicate with each other via a bus, for example. In some embodiments, the apparatus 1100 is a computing device or a computing system. The computing system may be a standalone computing system or a distributed computing system which includes multiple computing devices in communication with each other over a network, as well as optionally one or more additional components. The various operations described herein may be performed by different computing devices of a distributed system in some embodiments. In some embodiments, the apparatus 1100 is a virtual machine provided by a cloud computing system. In some embodiments, the apparatus 1100 is a cloud computing platform providing the NFs (e.g., MB-SMF, AMF, NEF, etc.) of a PLMN of the mobile telecommunication network.

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure and its advantages have been described in detail, it should be understood that various changes, substitutions and alterations can be made herein without departing from the invention as defined by the appended claims.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples but should be given the broadest interpretation consistent with the description as a whole.

The invention claimed is:

1. An apparatus comprising:
at least one processor; and
at least one memory comprising:
one or more index values, each index value of the one or more index values corresponding to a shared multicast/broadcast service to be provided via multiple public land mobile networks that are sharing radio access network nodes of a radio access network; and
instructions which, when executed by the at least one processor cause the apparatus at least to:
determine that a shared multicast/broadcast service to be provided via the multiple public land mobile networks is to be established;
select an index value from the one or more index values corresponding to the determined shared share multicast/broadcast service;
send, to a multicast/broadcast session management function of a first public land mobile network of the multiple public land mobile networks, a request for allocation of a temporary mobile group identity, the request comprising an index value to be used to select a temporary mobile group identity for the shared multicast/broadcast service; and
receive, from the multicast/broadcast session management function of the first public land mobile network, a response to the request for allocation of a temporary mobile group identity, the response comprising a first temporary mobile group identity for the shared multicast/broadcast service selected by the multicast/broadcast session management function of the first public land mobile network,
wherein the at least one memory comprises a plurality of index values, wherein the instructions which, when executed by the at least one processor cause the apparatus at least to:
determine that at least one other shared multicast/broadcast service to be provided via the multiple public land mobile networks is to be established;
select at least one other index value from the plurality of index values corresponding to the at least one other shared share multicast/broadcast service;
include the at least one other index value in the request for allocation of a temporary group mobile identifier; and
wherein the response comprises a temporary mobile group identity for each of the at least one other shared multicast/broadcast service selected by the multicast/broadcast session management function of the first public land mobile network.

2. The apparatus as claimed in claim 1, wherein the at least one memory comprises further instructions which, when executed by the at least one processor cause the apparatus to:
send a second request for allocation of a temporary mobile group identity to a multicast/broadcast session management function of a core network of a second public land mobile network of the multiple public land mobile networks, the second request comprising the index value to be used for allocation of a temporary mobile group identity for the shared multicast/broadcast service; and
receive, from the multicast/broadcast session management function of the core network of the second public land mobile network of the multiple public land mobile networks, a response to the second temporary mobile group identity allocation request, the response to the second temporary mobile group identity allocation request comprising a second a temporary mobile group identity for the shared multicast/broadcast service selected by the session management function of the core network of the second public land mobile network based on the index value.

3. The apparatus as claimed in claim 2, wherein the second request for allocation of a temporary mobile group identity is a temporary mobile group identity request.

4. The apparatus as claimed in claim 2, wherein instructions which, when executed by the at least one processor further cause the apparatus to at least one of:
trigger creation of a multicast/broadcast service session for the shared multicast/broadcast service in the first public land mobile network using the first temporary mobile group identity for the shared multicast/broadcast service; or trigger creation of a multicast/broadcast service session for the shared multicast/broadcast service in the second public land mobile network using the second temporary mobile group identity for the shared multicast/broadcast service.

5. The apparatus as claimed in claim 2, wherein the second request for allocation of a temporary mobile group identity is a second MBS session creation request comprising an indication that a temporary mobile group identity is to be allocated for the shared multicast/broadcast service.

6. The apparatus as claimed in claim 2, wherein the second request for allocation of a temporary mobile group identity is sent to the multicast/broadcast session management function of the core network of the second public land mobile network via a network exposure function of the core network of the second public land mobile network.

7. The apparatus as claimed in claim 2, wherein the at least one memory comprises further instructions which, when executed by the at least one processor cause the apparatus to:
send service announcements related to the shared multicast/broadcast service to one or more user equipment in the second public land mobile network using the second temporary mobile group identity.

8. The apparatus as claimed in claim 1, wherein the request for allocation of a temporary mobile group identity is a temporary mobile group identity request.

9. The apparatus as claimed in claim 1, wherein the request for allocation of a temporary mobile group identity is a multicast/broadcast service session creation request comprising an indication that a temporary mobile group identity is to be allocated for the shared multicast/broadcast service.

10. The apparatus as claimed in claim 1, wherein the request for allocation of a temporary mobile group identity is sent to the multicast/broadcast session management function of the core network of the public land mobile network via a network exposure function of the core network of the public land mobile network.

11. The apparatus as claimed in claim 1 wherein the instructions which, when executed by the at least one processor further cause the apparatus to:
send service announcements related to the shared multicast/broadcast service to one or more user equipment in the public land mobile network using the first temporary mobile group identity.

12. An apparatus comprising:
at least one processor;
at least one memory comprising:

information identifying a first public land mobile network comprising a lead multicast/broadcast session management function of multiple public land mobile networks that are sharing one or more radio access network nodes and provide at least one shared multicast/broadcast service;

instructions which, when executed by the at least one processor cause the apparatus at least to:

determine that a shared multicast/broadcast service to be provided via the multiple public land mobile networks is to be established;

send a first request for the allocation of a temporary mobile group identity to the lead multicast/broadcast session management function of a first public land mobile network of the multiple public land mobile networks, the first request comprising an indication indicating that first request relates to a shared multicast/broadcast service; and receive, from the lead multicast/broadcast session management function, a response to the first request for the allocation of a temporary mobile group identity, the response comprising a first temporary mobile group identity selected by the lead multicast/broadcast session management function for the shared multicast/broadcast session;

send a second request for the allocation of a second temporary mobile group identity to a second multicast/broadcast session management function of a second public land mobile network of the multiple public land mobile networks, the second request comprising the first temporary mobile group identity; and receive, from second multicast/broadcast session management function, a response to the second request, the response comprising the second temporary mobile group identity for the shared multicast/broadcast service selected by the second multicast/broadcast session management function based on the first temporary mobile group identity, wherein the instructions which, when executed by the at least one processor further cause the apparatus at least to:

determine that a second shared multicast/broadcast service to be provided via the multiple public land mobile networks is to be established;

include a second indication in the first request, the second indication indicating that first request relates to the second shared multicast/broadcast service;

receive a third temporary mobile group identity for the second shared multicast/broadcast service in the response to the first request;

include the third temporary mobile group identity in the second request; and receive a fourth temporary group identity for the second shared multicast/broadcast service selected by the second multicast/broadcast session management function based on the third temporary mobile group identity.

13. The apparatus as claimed in claim 12, wherein at least one of the first request for allocation of a temporary mobile group identity or the second request is for allocation of a temporary mobile group identity a temporary mobile group identity request.

14. The apparatus as claimed in claim 12, wherein the instructions which, when executed by the at least one processor further cause the apparatus to at least one of:

trigger creation of a multicast/broadcast service session for the shared multicast/broadcast service in the first public land mobile network using the first temporary mobile group identity for the shared multicast/broadcast service; or trigger creation of a multicast/broadcast service session for the shared multicast/broadcast service in the second public land mobile network using the second temporary mobile group identity for the shared multicast/broadcast service.

15. The apparatus as claimed in claim 12, wherein at least one of the first request for allocation of a temporary mobile group identity or the second request for allocation of a temporary mobile group identity is a multicast/broadcast service session creation request comprising an indication that a temporary mobile group identity is to be allocated for the shared multicast/broadcast service.

16. The apparatus as claimed in claim 12, wherein the first request for allocation of a temporary mobile group identity is sent to the multicast/broadcast session management function of the core network of the first public land mobile network via a network exposure function of the core network of the first public land mobile network and the second request for allocation of a temporary mobile group identity is sent to the multicast/broadcast session management function of the core network of the second public land mobile network via a network exposure function of the core network of the second public land mobile network.

17. The apparatus as claimed in claim 12, wherein the at instructions which, when executed by the at least one processor further cause the apparatus to at least one of:

send service announcements related to the shared multicast/broadcast service to one or more user equipment in the first public land mobile network using the first temporary mobile group identity; or send service announcements related to the shared multicast/broadcast service to one or more user equipment in the second public land mobile network using the second temporary mobile group identity.

* * * * *